United States Patent [19]

Hihara et al.

[11] Patent Number: 4,988,801
[45] Date of Patent: Jan. 29, 1991

[54] WATER SOLUBLE MONOAZO DYE-STUFFS CONTAINING VINYLSULFONE AND HALOGENOTRIAZINE OR DIFLUOROMONOCHLORO PYRIMIDINE TYPE REACTIVE GROUPS

[75] Inventors: Toshio Hihara; Kanzi Shimizu; Yukiharu Shimizu, all of Kitakyushu, Japan

[73] Assignee: Mitsubishi Kasei Corporation, Japan

[21] Appl. No.: 453,342

[22] Filed: Dec. 20, 1989

Related U.S. Application Data

[63] Continuation of Ser. No. 178,504, Apr. 7, 1988, abandoned.

[30] Foreign Application Priority Data

Apr. 9, 1987 [JP] Japan .................. 62-87611

[51] Int. Cl.$^5$ .................. C09B 62/085; C09B 62/245; D06P 1/665; D06P 3/66
[52] U.S. Cl. .................. 534/632; 534/617; 534/638; 534/642
[58] Field of Search ............... 534/617, 632, 638, 642

[56] References Cited

U.S. PATENT DOCUMENTS

| | | | |
|---|---|---|---|
| 4,211,698 | 7/1980 | Hurter | 534/628 X |
| 4,315,865 | 2/1982 | Hoyer et al. | 534/642 X |
| 4,649,193 | 3/1987 | Meininger et al. | 534/622 |
| 4,703,112 | 10/1987 | Mischke et al. | 534/642 |
| 4,746,323 | 5/1988 | Phillips et al. | 534/642 X |

FOREIGN PATENT DOCUMENTS

| | | | |
|---|---|---|---|
| 040790 | 5/1981 | European Pat. Off. | |
| 079563 | 11/1982 | European Pat. Off. | |
| 0122599 | 10/1984 | European Pat. Off. | 534/642 |
| 0184071 | 6/1986 | European Pat. Off. | 534/617 |
| 61-111364 | 5/1986 | Japan | 534/617 |

*Primary Examiner*—Floyd D. Higel
*Attorney, Agent, or Firm*—Jordan B. Bierman

[57] ABSTRACT

A water-soluble monoazo colorant represented by formula (I) in a form of a free acid:

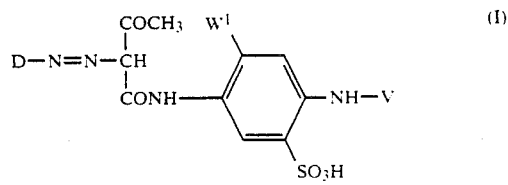

wherein
D represents

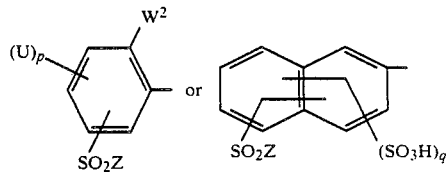

(wherein $W^2$ represents lower alkoxy; U represents lower alkyl or lower alkoxy; Z represents $-CH=CH_2$ or $-CH_2CH_2OSO_3H$ and p and q represent each 0 or 1);
$W^1$ represents lower alkoxy; and
V represents

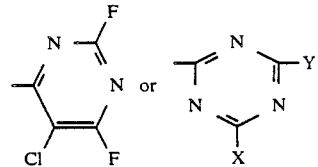

(wherein X represents halogen; Y represents halogen, sulfo, $-OR^1$ wherein $R^1$ represents lower alkyl or lower alkyl substituted by hydroxy, carboxy or sulfo, $-O-(R^2O)_mR^3$ alkyl and m is an integer of 1 to 6, or aliphatic or aromatic amino each substituted by one or two sulfo or carboxy groups);
as well as a dyeing process by using the same. These colorants are useful in the dyeing of fibers.

2 Claims, No Drawings

WATER SOLUBLE MONOAZO DYE-STUFFS CONTAINING VINYLSULFONE AND HALOGENOTRIAZINE OR DIFLUOROMONOCHLORO PYRIMIDINE TYPE REACTIVE GROUPS

This application is a Continuation of application Ser. No. 178,504, filed Apr. 7, 1988, now abandoned.

BACKGROUND OF THE INVENTION

1. Field of the Invention

This invention relates to a novel greenish yellow water-soluble monoazo colorant and a dyeing process by using the same. More particularly, it relates to a water-soluble monoazo colorant, which has a vinylsulfone type reactive group at a side of the diazo component and a di- or mono-halogenotriazine type reactive group or a difluoromonochloropyrimidine type reactive group at a side of the coupling component and is particularly useful in dyeing cellulose or nitrogen-containing fibers, and a dyeing process by using the same.

2. Prior Art

There have been usually employed water-soluble reactive dyestuffs in dyeing cellulose or nitrogen-containing fibers. It is required that these reactive dyestuffs have excellent heat-sensitivity and level dyeing property and can intensely dye fibers. It is further required that the fibers thus dyed are fast to various factors. The properties of these reactive dyestuffs would delicately vary depending on their chemical structure, especially on the basic skeleton, substituents, reactive groups and the combination thereof. There have been proposed a number of dyestuffs of various structures and considerably satisfactory ones have been put into practical use hitherto.

Among reactive dyestuffs, however, no greenish yellow dyestuff satisfying every requirement has been developed so far. That is to say, a conventional greenish yellow reactive dyestuff having an excellent level dyeing property is inferior in, for example, a fastness to light, chlorine or perspiration and daylight. On the other hand, many of conventional dyestuffs which are highly fast to various factors would be largely affected by temperature and salt concentration, and inferior in the level dyeing property.

For example, the following dyestuffs disclosed in Japanese Pat. Application (OPI) Nos. 155469/86 and 99763/84 (the term "OPI" as used herein refers to a "published unexamined Japanese patent application") largely depend on temperature and salt concentration, although they are highly fast to, for example, light, chlorine, perspiration and daylight:

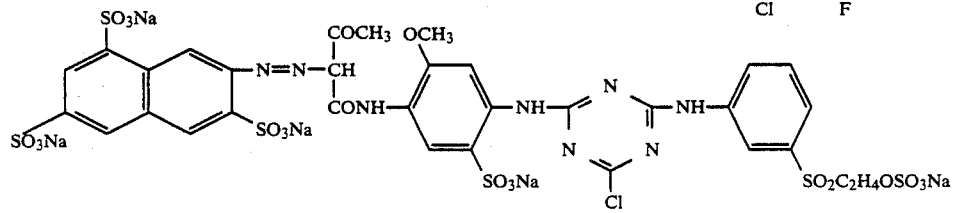

(disclosed in Japanese Pat. Application (OPI) No. 155469/86); and

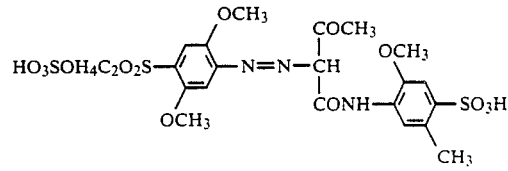

(disclosed in Japanese Pat. Application (OPI) No. 199763/84).

The present invention is to provide novel greenish yellow water-soluble monoazo colorants, which are highly fast to, for example, light, chlorine, perspiration and daylight, less depends on temperature or salt concentration and has an excellent level dyeing property, as well as a dyeing process by using the same.

SUMMARY OF THE INVENTION

Accordingly, it is the primary object of the present invention to provide a water-soluble monoazo colorant of formula (I):

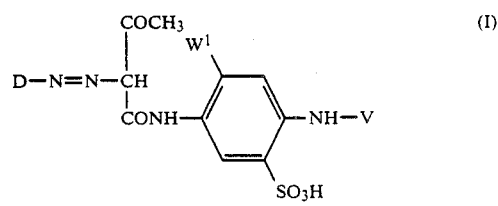

wherein
D represents

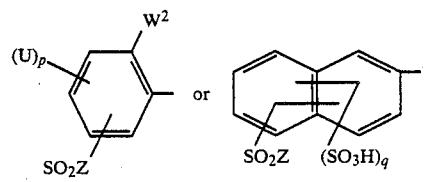

(wherein $W^2$ represents lower alkoxy; U represents lower alkyl or lower alkoxy; Z represents —CH=CH$_2$ or —CH$_2$Ch$_2$OSO$_3$H and p and q represent each 0 or 1);
$W^1$ represents lower alkoxy; and
V represents

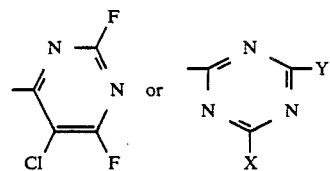

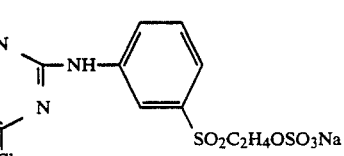

( wherein X represents halogen; Y represents halogen, sulfo,—OR$^1$ wherein R$^1$ represents lower alkyl optionally substituted by hydroxy, carboxy or sulfo,—O—(R-$^2$O)$_m$-R$^3$ wherein R$^2$ represents lower alkylene, R$^3$ represents lower alkyl and m is an integer of 1 to 6, or aliphatic or aromatic amino each substituted by one or two sulfo or carboxy groups);
as well as a dyeing process by using the same.

DETAILED DESCRIPTION OF THE INVENTION

Now the present invention will be described in detail. In formula (I) as shown above, D represents

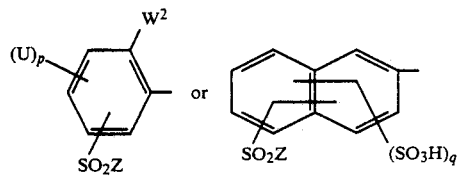

wherein W$^2$, U, Z, p and q are defined above. Among these groups,

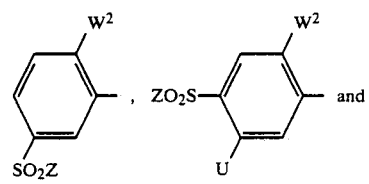

wherein W$^2$, U, Z, p and q are as defined above, are preferable. Further, preferably D represents

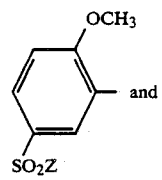

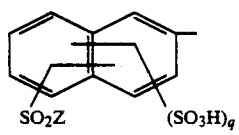

wherein Z and q are as defined above and furthermore preferably D represents

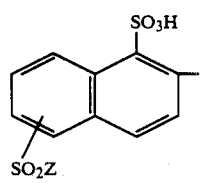

wherein Z is as defined above. The most preferable group for D is

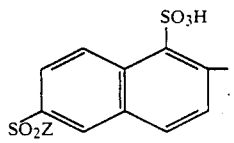

On the other hand, V represents

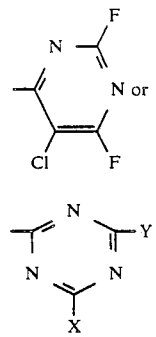

wherein X and Y are is defined above. V preferably represents

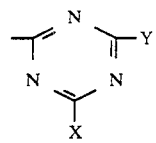

wherein X and Y are as defined above. Examples of the halogen represented by X or Y include fluorine, chlorine, and bromine, and preferably include fluorine or chlorine.

Examples of the lower alkyl represented by R$^1$ and R$^3$ include straight-chain or branched alkyl having 1 to 4 carbon atoms such as methyl, ethyl and propyl. The lower alkyl represented by R$^1$ may be optionally substituted by hydroxy, carboxy or sulfo. Examples of such substituted lower alkyl include 2-hydroxyethyl, 4-hydroxybutyl, 2-carboxyethyl, 2- sulfoethyl and so on. Examples of the lower alkylene represented by R$^2$ include those having 1 to 4 carbon atoms such as methylene, ethylene, propylene and butylene. m represents an integer of 1 to 6, preferably 1 to 4.

Examples of the aliphatic or aromatic amino each substituted by one or two sulfo or carboxy represented by Y include, for example, the following lower alkylamino, phenylamino and naphthylamino each substituted by one or two sulfo or carboxy groups:

—NHC$_2$H$_4$SO$_3$H, —NHC$_3$H$_6$SO$_3$H, —NHCH$_2$COOH,

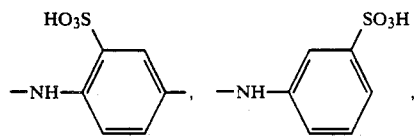

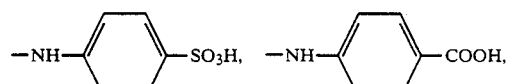

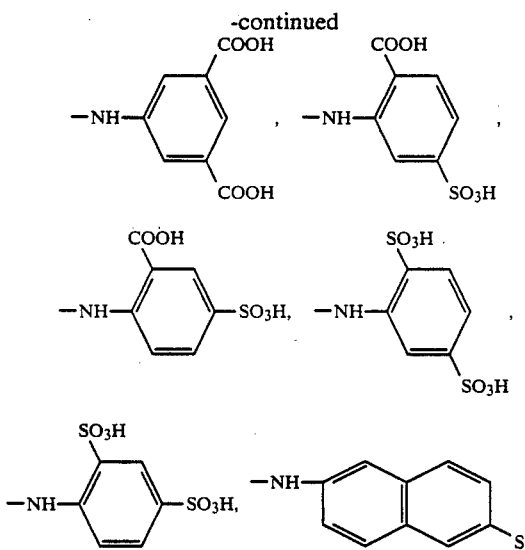

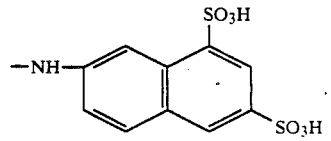

Preferable examples of Y include lower alkylamino, phenylamino and naphthylamino, each substituted by one or two sulfo or carboxy groups. Lower alkylamino, phenylamino or naphthylamino, each substituted by one or two sulfo groups is the most preferable for Y. Then lower alkylamino carries 1 to 4 carbon atoms.

A typical examples of the lower alkoxy represented by $W^1$, $W^2$ or U is methoxy or ethoxy. A typical example of the lower alkyl represented by U is methyl or ethyl.

A particularly preferable example of the water-soluble monoazo colorant of the present invention represented by the general formula (I) as shown above is a colorant of formula (I-1) in the form of a free acid:

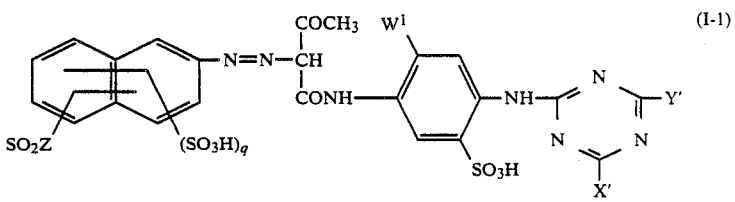

wherein
$W^1$ represents alkoxy having 1 or 2 carbon atoms;
Z represents —CH=CH$_2$ or —CH$_2$CH$_2$OSO$_3$H;
q is 0 or 1;
X' represents chlorine or fluorine; and
Y' represents lower alkylamino, phenylamino or naphthylamino, each substituted by one or two sulfo or carboxy groups.

A colorant of formula (I-2) in the form of a free acid is still preferable.

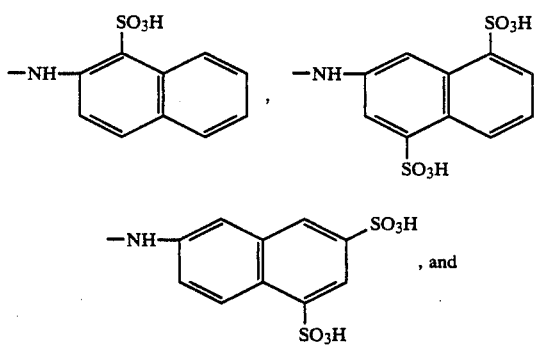

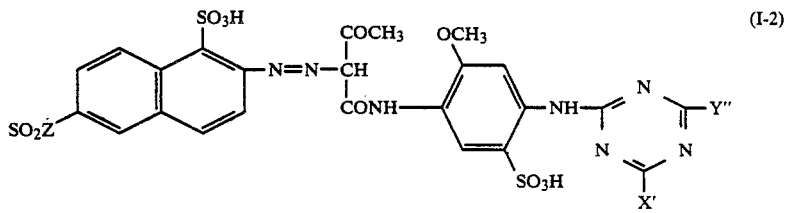

wherein
Z represents —CH=CH$_2$ or —CH$_2$CH$_2$OSO$_3$H;
X' represents chlorine or fluorine; and
Y" represents lower alkylamino, phenylamino or naphthylamino, each substituted by one or two sulfo groups.

In addition, a colorant of formula (I-3) in the form of a free acid is also preferable therefor:

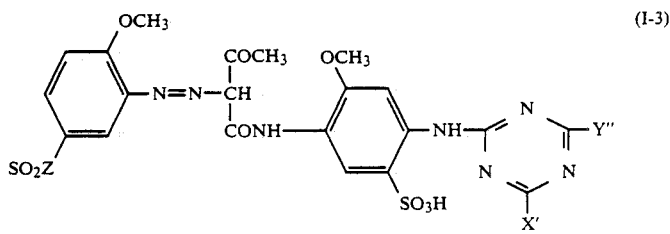
(I-3)

wherein
   wherein Z represents —CH=CH$_2$ or —C$_2$H$_4$OSO$_3$H;
   X' represents chlorine or fluorine; and
   Y" represents lower alkylamino, phenylamino or naphthylamino, each substituted by one or two sulfo groups.

The water-soluble monoazo colorant of the present invention is usually present in the form of a free acid or a salt thereof. Examples of the salt include alkali metal salts and alkaline earth metal salts. Among these salts, lithium, sodium and potassium salts are particularly preferable.

The monoazo colorant of the present invention represented by formula (I) as shown above may be prepared by, for example, the following method.

One mol of a triazine or pyrimidine compound of formula (II): wherein V and X are as defined in formula (I); in the form of a free acid is condensed with 1 mol of a compound of formula (III):

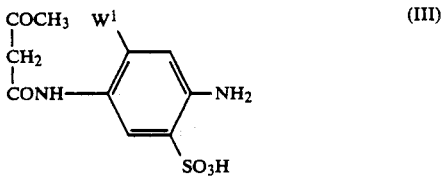
(III)

wherein W$^1$ is as defined in formula (I); in an aqueous medium to obtain a compound of formula (IV):

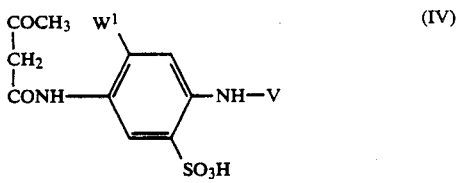
(IV)

wherein W$^1$ and V are as defined in formula (I); in the form of a free acid.

Separately 1 mol of a compound of formula (V):

   D—NH$_2$                                                (V)

wherein D is as defined in formula (I); is converted into a diazo derivative in a conventional manner. Then the product thus obtained is coupled with 1 mol of the compound (IV) as obtained above to obtain the aimed monoazo colorant (I). The aimed product may be recovered from the reaction mixture by a conventional manner such as salting-out or spray-dry.

The monoazo colorant of the present invention is widely available as, for example, a dyestuff for dyeing fibers and fabrics, a colorant for coloring paper and synthetic resins and an ink for ink-jet printers. It is particularly useful as a dyestuff.

The monoazo colorant of the present invention is useful as a dyestuff for dyeing various fibers including cellulose fibers such as cotton, viscose rayon, cuprammonium rayon and linen and nitrogen-containing fibers such as polyamide, wool and silk. It is particularly suitable in dyeing cellulose fiber. These fibers may be mixed with, for example, polyester, triacetate or polyacrylonitrile.

A cellulose or nitrogen-containing fiber may be dyed with the monoazo dyestuff of the present invention by a conventional process in the presence of an acid binder selected from inorganic alkalis such as sodium bicarbonate and sodium carbonate or organic bases such as triethylamine.

As dyeing process of the present invention, dip dyeing is suitable. The dyeing may be carried out at a temperature of approximately 40° to 80° C., preferably 40° to 60° C.

The monoazo colorant of the present invention may be further applied to other dyeing processes which can be applied in the case of using conventional reactive dyestuffs such as cold pad batching, pad steaming and printing.

The water-soluble monoazo colorant of the present invention is a novel greenish yellow monoazo colorant characterized by having a vinylsulfone type reactive group at a side of the diazo component and a di- or mono-halogenotriazine type reactive group or a difluoromonochloropyrimidine type reactive group at a side of the coupling component. It is particularly suitable in dyeing cellulose or nitrogen containing fibers. By using the water-soluble monoazo colorant of the present invention as a dyestuff, a cellulose or nitrogen-containing fiber can be intensely and uniformly dyed. In addition, the fiber thus dyed is highly fast to, for example, light, chlorine, perspiration and daylight. Furthermore, the colorant of the present invention has a low temperature dependence, a lower salt concentration dependence and an excellent build-up property, compared with conventional greenish yellow reactive dyestuff. That is to say, it is superior to conventional dyestuffs in all respects and thus highly useful in industrial use.

To further illustrate the present invention, and not by way of limitation, the following Examples will be given.

EXAMPLE 1

An amino compound of formula:

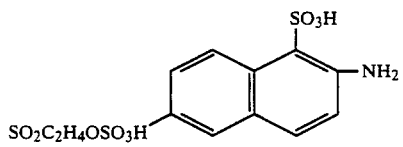

in the form of a free acid was converted into a diazo compound in a conventional manner. Then the obtained product was coupled with an equimolar amount of a compound of formula:

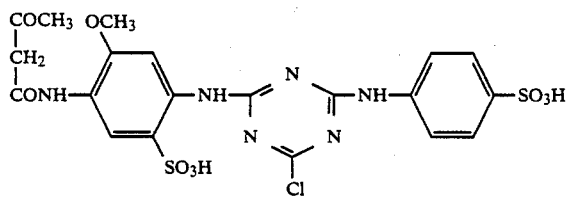

in the form of a free acid in an aqueous medium at 0° to 5° C. and at a pH of 7 to 8. After the completion of the coupling, the reaction mixture was salted out by using potassium chloride. The precipitate was separated by filtration and was dried. Thus a monoazo colorant of formula (represented as a free acid) having the maximum absorption wavelength as shown below was obtained:

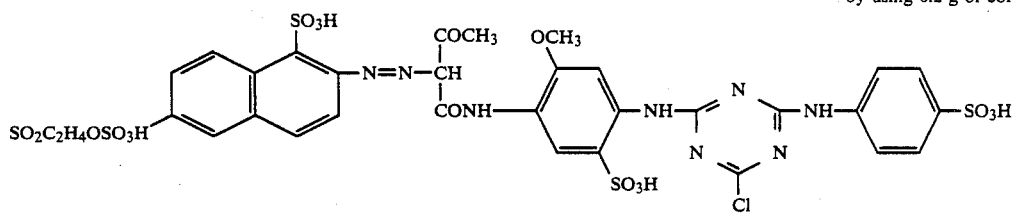

0.2 g of the monoazo colorant as obtained above was dissolved in 200 ml of water and then 10 g of Glauber's salt was added to obtain a dyeing bath. The Glauber's salt concentration thereof was 50 g/l. 10 g of an unmercerized cotton knitted fabric was immersed in the dyeing bath and heated to 60° C. within 30 minutes. Then 3.0 g of sodium carbonate was added thereto and dyeing was effected at 60° C. for additional one hour. Subsequently the fabric was washed with water, soaped, washed with water again and dried to thereby give a fabric dyed greenish yellow.

The resulting fabric was uniformly and intensely dyed. The fastness to light of this dyed fabric was good, i.e., the 6th grade as determined according to JIS L-0842. The fastness to chlorine thereof was excellent, i.e., the 4th to 5th grades as determined according to JIS L-0844 at an effective chlorine concentration of 20 ppm. The fastness to perspiration and daylight thereof was extremely good, i.e., the 4th grade as determined according to JIS L-0888 A: Alkali.

The surface density of the dyed fabric was evaluated by measuring the surface reflectance with a color difference meter (manufactured by Nippon Denshoku Kogyo K.K.).

In order to examine the salt-concentration dependence, temperature dependence and build-up property of the colorant as used in the present Example at the dyeing step, the above procedure was followed except that (1) the Glauber's salt concentration of the dyeing bath was adjusted to 20 g/l; (2) the dyeing was carried out at 40° C.; or (3) 0.8 g of the colorant was employed. Then the surface density of each fabric thus dyed was determined. Thus the salt-concentration dependence, temperature dependence and build-up property were determined according to the following equations:

$$\text{salt-concentration dependence} = \frac{\text{surface density of fabric dyed at Glauber's salt conc. of 20 g/l}}{\text{surface density of fabric dyed at Glauber's salt conc. of 50 g/l}} \times 100$$

$$\text{temperature dependence} = \frac{\text{surface density of fabric dyed at 40° C.}}{\text{surface density of fabric dyed at 60° C.}} \times 100$$

$$\text{build-up property} = \frac{\text{surface density of fabric dyed by using 0.8 g of colorant}}{\text{surface density of fabric dyed by using 0.2 g of colorant}} \times 100$$

These results are summarized in Table 1.

COMPARATIVE EXAMPLES 1 AND 2

The procedure of Example 1 was followed except that the monoazo colorant was replaced by the following ones. Table 1 shows the results. Comparative Example 1:

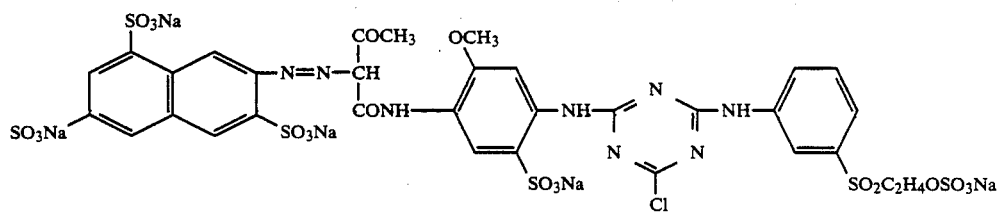

(disclosed in Japanese Pat. Application (OPI) NO. 155469/86).

Comparative Example 2

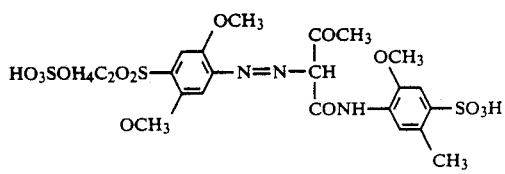

(disclosed in Japanese Pat. Applicaton (OPI) NO. 199763/84).

TABLE 1

| Dyed Fabric | Salt-Concentration Dependence (20 g/l/50 g/l) | Temperature Dependence (40° C./60° C.) | Build-up Property (0.8 g/0.2 g) |
|---|---|---|---|
| Example 1 | 90 | 90 | 300 |
| Comparative Example 1 | 80 | 80 | 260 |

TABLE 1-continued

| Dyed Fabric | Salt-Concentration Dependence (20 g/l/50 g/l) | Temperature Dependence (40° C./60° C.) | Build-up Property (0.8 g/0.2 g) |
|---|---|---|---|
| Comparative Example | 70 | 50 | 315 |

EXAMPLES 2 TO 30

Monoazo colorants of the present invention of formulae as shown in Tables 2 and 3 (each given as a free acid) were prepared according to he method as described in Example 1. By using each colorant thus obtained, a cotton fabric was dyed in the same manner as the one described in Example 1. Thus the fabric uniformly and intensely dyed greenish yellow. Tables 2 and 3 show the results. Each fabric thus dyed had high fastnesses to light (the 6th grade), to chlorine (the 4th to 5th grades) and to perspiration and daylight (the 4th grade).

TABLE 2

General formula

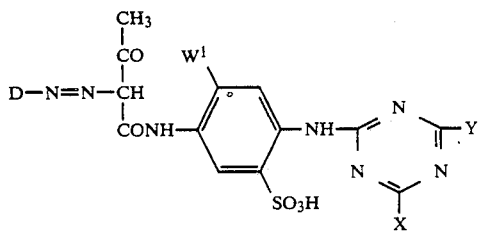

| Example No. | D— | $W^1$ / SO_3H (ring) | —X | —Y | Color tone of Cotton fabric | λmax (water) (nm) |
|---|---|---|---|---|---|---|
| 2 | naphthalene with SO_3H and SO_2C_2H_4OSO_3H | OCH_3 / SO_3H (benzene) | —Cl | —NH—C_6H_4—SO_3H | greenish yellow | 394 |
| 3 | " | " | " | —OC_2H_4OC_2H_4OCH_3 | " | 393 |
| 4 | " | " | " | —OC_2H_4OH | " | " |
| 5 | naphthalene with SO_3H and SO_2C_2H_4OSO_3H | OC_2H_5 / SO_3H (benzene) | —Cl | —NHC_2H_4COOH | greenish yellow | 394 |
| 6 | " | OCH_3 / SO_3H (benzene) | " | —Cl | " | 391 |
| 7 | " | " | " | —SO_3H | " | 390 |
| 8 | " | " | —F | " | " | 390 |

TABLE 2-continued

General formula:

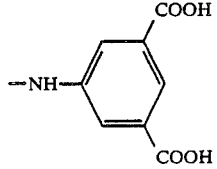

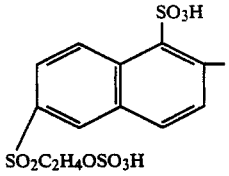

| Example No. | D— | W¹ / SO₃H (ring) | —X | —Y | Color tone of Cotton fabric | λmax (water) (nm) |
|---|---|---|---|---|---|---|
| 9 | " | " | —Cl | —NH-(3,5-dicarboxyphenyl) 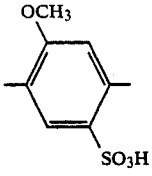 | " | 394 |
| 10 | naphthalene with SO₃H and SO₂C₂H₄OSO₃H 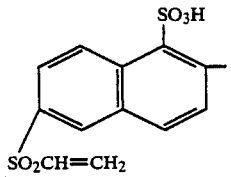 | OCH₃ / SO₃H 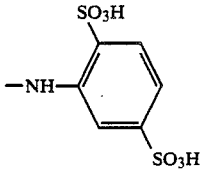 | —F | —OC₂H₄COOH | greenish yellow | 393 |
| 11 | " | " | —Cl | —NHC₂H₄SO₃H | " | 394 |
| 12 | naphthalene with SO₃H and SO₂CH=CH₂ 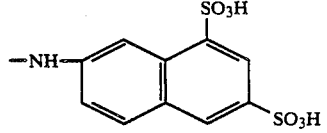 | " | " | —NH-(2,5-disulfophenyl) 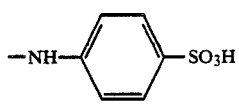 | " | 395 |
| 13 | " | " | —F | —NH-(naphthalene disulfonic acid) 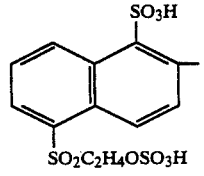 | " | 396 |
| 14 | " | " | " | —NH-C₆H₄-SO₃H 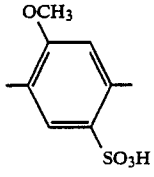 | " | 396 |
| 15 | naphthalene with SO₃H and SO₂C₂H₄OSO₃H 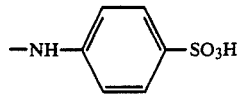 | OCH₃ / SO₃H | —Cl | —NH-C₆H₄-SO₃H | greenish yellow | 393 |
| 16 | " | " | —F | —NHC₂H₄SO₃H | " | 395 |

TABLE 2-continued

General formula:

$$D-N=N-\underset{\underset{CONH}{|}}{\overset{\overset{CH_3}{|}}{\underset{|}{CO}}}\overset{}{\underset{}{CH}} - \text{[Ar(W}^1\text{)(SO}_3\text{H)]} - NH-\text{[triazine(X)(Y)]}$$

| Example No. | D— | [Ar with W¹ and SO₃H] | —X | —Y | Color tone of Cotton fabric | λmax (water) (nm) |
|---|---|---|---|---|---|---|
| 17 | 7-(SO₂C₂H₄OSO₃H)-naphthalene-1-SO₃H | " | —Cl | " | " | 394 |
| 18 | " | " | " | —NH—C₆H₄—SO₃H (para) | " | 393 |
| 19 | 1-(SO₂C₂H₄OSO₃H)-7-naphthyl, 3-SO₃H | " | —Br | —O—(C₂H₄O)₆CH₃ | " | 394 |
| 20 | 1-(SO₂C₂H₄OSO₃H)-7-naphthyl | 4-OCH₃ phenyl, SO₃H | —Cl | —NH—C₆H₃(COOH)(SO₃H) | greenish yellow | 395 |
| 21 | 2-(SO₂C₂H₄OSO₃H)-7-naphthyl | " | —F | —NH—naphthyl(SO₃H)₂ (1,3-disulfo-6-amino) | " | 395 |
| 22 | 2-OCH₃-5-(SO₂C₂H₄OSO₃H)-phenyl | " | —Cl | —NH—C₆H₄—SO₃H | " | 397 |
| 23 | " | " | —F | —NHC₂H₄SO₃H | " | 398 |
| 24 | 2-OCH₃-3-methyl-5-(SO₂CH=CH₂)-phenyl | 4-OC₂H₅ phenyl, SO₃H | —F | —NH—C₆H₃(SO₃H)₂ | greenish yellow | 397 |

TABLE 2-continued

General formula:

$$D-N=N-\underset{\underset{CONH}{|}}{\overset{\overset{CH_3}{|}}{\underset{|}{C}}} \text{—[benzene ring with } W^1, SO_3H\text{]—NH—[triazine with X, Y]}$$

$W^1$ is on benzene ring with $SO_3H$

| Example No. | D— | $W^1$ / $SO_3H$ | —X | —Y | Color tone of Cotton fabric | λmax (water) (nm) |
|---|---|---|---|---|---|---|
| 25 | $HO_3SOH_4C_2O_2S$—[benzene with $OCH_3$, $OCH_3$, $OCH_3$] | $OCH_3$ / $SO_3H$ | —Cl | —$OC_2H_4OH$ | " | 401 |
| 26 | $HO_3SOH_4C_2O_2S$—[benzene with $OCH_3$, $CH_3$] | $OCH_3$ / $SO_3H$ | " | —NH—[naphthalene with $SO_3H$, $SO_3H$] | " | 397 |
| 27 | [benzene with $OC_2H_5$, $SO_2C_2H_4OSO_3H$] | " | " | —$SO_3H$ | " | 396 |

TABLE 3

General formula:

$$D-N=N-\underset{\underset{CONH}{|}}{\overset{\overset{CH_3}{|}}{\underset{|}{C}}} \text{—[benzene ring with } W^1, SO_3H\text{]—NH—[pyrimidine with F, Cl, F]}$$

| Example No. | D— | $W^1$ / $SO_3H$ | Color tone of Cotton fabric | λmax (water) (nm) |
|---|---|---|---|---|
| 28 | [naphthalene with $SO_3H$, $SO_2C_2H_4OSO_3H$] | $OCH_3$ / $SO_3H$ | greenish yellow | 391 |

TABLE 3-continued

General formula

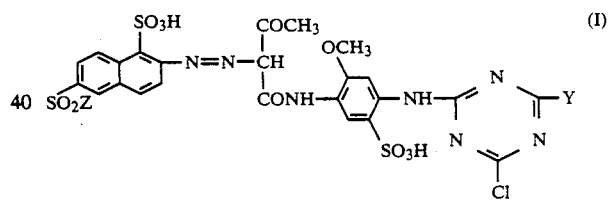

| Example No. | D— | W¹ SO₃H | Color tone of Cotton fabric | λmax (water) (nm) |
|---|---|---|---|---|
| 29 | SO₂C₂H₄OSO₃H-naphthalene-SO₃H | " | " | 392 |
| 30 | 2-OCH₃, 4-SO₂C₂H₄OSO₃H phenyl | " | " | 394 |

While the invention has been described in detail and with reference to specific embodiment thereof, it will be apparent to one skilled in the art that various changes and modifications can be made therein without departing from the spirit and scope thereof.

What is claimed is:

1. A water-soluble monoazo colorant represented by the following formula in the form of the free acid:

wherein Y represents lower alkylamino substituted by one sulfo group or phenylamino substituted by one or two sulfo groups and Z represents —CH=CH₂ or —CH₂CH₂OSO₃H.

2. The colorant of claim 1, wherein said lower alkylamino is a 1-4 carbon lower alkylamino.

* * * * *